US006722977B1

(12) United States Patent
Heflin

(10) Patent No.: US 6,722,977 B1
(45) Date of Patent: Apr. 20, 2004

(54) COLLECTOR CARD/PHONE CARD DISPENSING SYSTEM WITH PROMOTIONAL INSTANT WIN GAME PIECE FEATURE

(76) Inventor: Keith Heflin, 439 Naron Dr., Shelbyville, TN (US) 37160

( * ) Notice: Subject to any disclaimer, the term of this patent is extended or adjusted under 35 U.S.C. 154(b) by 0 days.

(21) Appl. No.: 09/398,967

(22) Filed: Sep. 17, 1999

Related U.S. Application Data

(63) Continuation-in-part of application No. 08/925,860, filed on Sep. 9, 1997, now Pat. No. 6,213,874.

(51) Int. Cl.[7] ........ A63F 13/00

(52) U.S. Cl. ........ 463/17; 463/36; 463/4; 273/118

(58) Field of Search ........ 463/1, 16, 46, 463/17, 18; 273/138.2, 139, 118 A; 221/1, 2, 3, 9

(56) References Cited

U.S. PATENT DOCUMENTS 5,222,624 A * 6/1993 Burr ........ 221/1
5,301,834 A * 4/1994 Lee et al. ........ 221/129
5,366,110 A * 11/1994 Takemoto et al. ........ 221/2
5,697,611 A * 12/1997 Kelly et al. ........ 273/126 A
5,735,432 A * 4/1998 Stoken et al. ........ 221/1
5,810,664 A * 9/1998 Clapper, Jr. ........ 463/17
5,868,236 A * 2/1999 Rademacher ........ 194/217
5,868,237 A * 2/1999 Rademacher et al. ........ 194/217
5,927,541 A * 7/1999 Stoken et al. ........ 221/2
5,941,771 A * 8/1999 Haste, III ........ 463/17
5,959,869 A * 9/1999 Miller et al. ........ 222/7
6,038,492 A * 3/2000 Nichols et al. ........ 221/2
6,056,150 A * 5/2000 Kasper ........ 221/21

* cited by examiner

*Primary Examiner*—John M. Hotaling, II
(74) *Attorney, Agent, or Firm*—Waddey & Patterson; Mark J. Patterson

(57) ABSTRACT

A system and method for promoting and dispensing collector's cards to a plurality of users. The system includes a microprocessor connected to a currency acceptor, a collector's card dispenser, and a game piece dispenser. When currency is inserted into the currency acceptor, the microprocessor registers the signal provided by the currency acceptor and directs the collector's card dispenser to distribute at least one collector's card according to the amount of currency entered. As a promotion to encourage the sale of the collector's cards, the system also dispenses a game piece simultaneously with the collector's card, that allows the user to play a game of chance.

25 Claims, 5 Drawing Sheets

INSIDE LEFT VIEW

COLLECTOR CARD/PHONE CARD DISPENSING SYSTEM WITH PROMOTIONAL INSTANT WIN GAME PIECE FEATURE

This application is a continuation-in-part application of U.S. patent application Ser. No. 08/925,860 filed Sep. 9, 1997, now U.S. Pat. No. 6,213,874 entitled "Collector Card/Phone Card Dispensing System with Promotional Free Spin/Free Draw Game Feature."

BACKGROUND OF THE INVENTION

This invention relates generally to a device for distributing cards, and, in particular, to a card dispensing machine and system that includes a promotional Instant Win Card game feature used to increase interest in purchasing such collector's cards.

Collecting special collector's series cards, or collector's cards, has become increasingly popular with the general public. Such collector's cards are used for entertainment purposes in various ways, such as exchanging them with other collectors or saving them as a memento containing special significance to the collector. Collecting these cards has grown to such a great extent that it is reported that certain distributors of collector's cards distribute over one billion cards each year. Therefore, distributors are continuously looking for new and unusual ways to distribute collector's cards and to increase interest in their particular brand of cards.

Most new collector's cards are purchased at retail stores and specialty shops from counter stock or display stock. The customer selects the card or the card package and then pays a clerk or cashier. Promotions are often tied into the sale, such as bubble gum, three-dimensional cards, and stickers, to increase distribution. Therefore, it is advantageous to a distributor to provide a distinguishing promotion in order to encourage customers to purchase their collector's cards. What is needed, however, is a system and method of distributing collector's cards to customers that is efficient and low cost and that adds promotional value to the transaction.

SUMMARY OF THE INVENTION

The present invention provides an automated dispenser system and method for distributing collector's cards that includes a promotional device that provides an opportunity to a user to play an instant win game. A novel feature of this system is the unique manner in which both the collector's card and the instant win game piece are dispensed in conjunction so that the buyer will have a promotional opportunity to play an instant win game when the buyer purchases a collector's card. In accordance with one object of the invention, a paper currency acceptor accepts currency from a user and then a computerized card dispenser delivers a collector's card to the user in response thereto. To increase the value to the collector, a computerized promotional game piece dispenser is also provided in the system, wherein the game piece dispenser includes a promotional feature for amusement which confers a game piece or pieces to the user for the user to play an instant win match game simultaneously with the purchase of a collector's card.

The instant win game can be one of many games played on a single game piece, such as a pull-tab game or a rub-off game. If the customer has a pull-tab game piece, then the customer can break open the pull-tab on the game piece to determine if the customer is a winner. If the customer has a rub-off game piece, then the customer can rub off a covering on the game piece to view a hidden pattern of symbols that reveals if the customer has won a promotional prize.

The operation of the system is overseen by a licensee who is able to assist in the distribution of the games. The licensee is also needed to provide free game pieces for persons with vouchers from a No Purchase Entry form so that the person can play a promotional game without purchasing a product.

A preferred embodiment of the system combines a pair of interface cards connected to the collector's card dispenser and the game piece dispenser. A collector's card dispenser interface card is connected to the collector's card dispenser to control the collector's card dispenser. Additionally, the game piece dispenser interface card is connected to the game piece dispenser to control the game piece dispenser. These connections will allow the card dispensers to work in conjunction with the distribution of the collector's cards and the instant win game pieces after the insertion of the appropriate amount of money. Additionally, both the collector's card dispenser and the game piece dispenser provide information to the user using an Out of Service light, a Card Jam light, and a Ready light.

When either dispenser is depleted of stock or game pieces, two things occur. An interrupt switch is activated by either the collector's card dispenser interface card or the free game piece dispenser interface card, depending on which dispenser is empty, and the switch disables the system from playing until the licensee of the system places more product in the dispenser. Concurrently, an "Out of Service" light on the cabinet is illuminated with respect to the dispenser that is empty and the licensee of the system is thereby notified to replenish the system either with collector's cards or with promotional game pieces.

DESCRIPTION OF THE PREFERRED EMBODIMENTS

Figure 1:
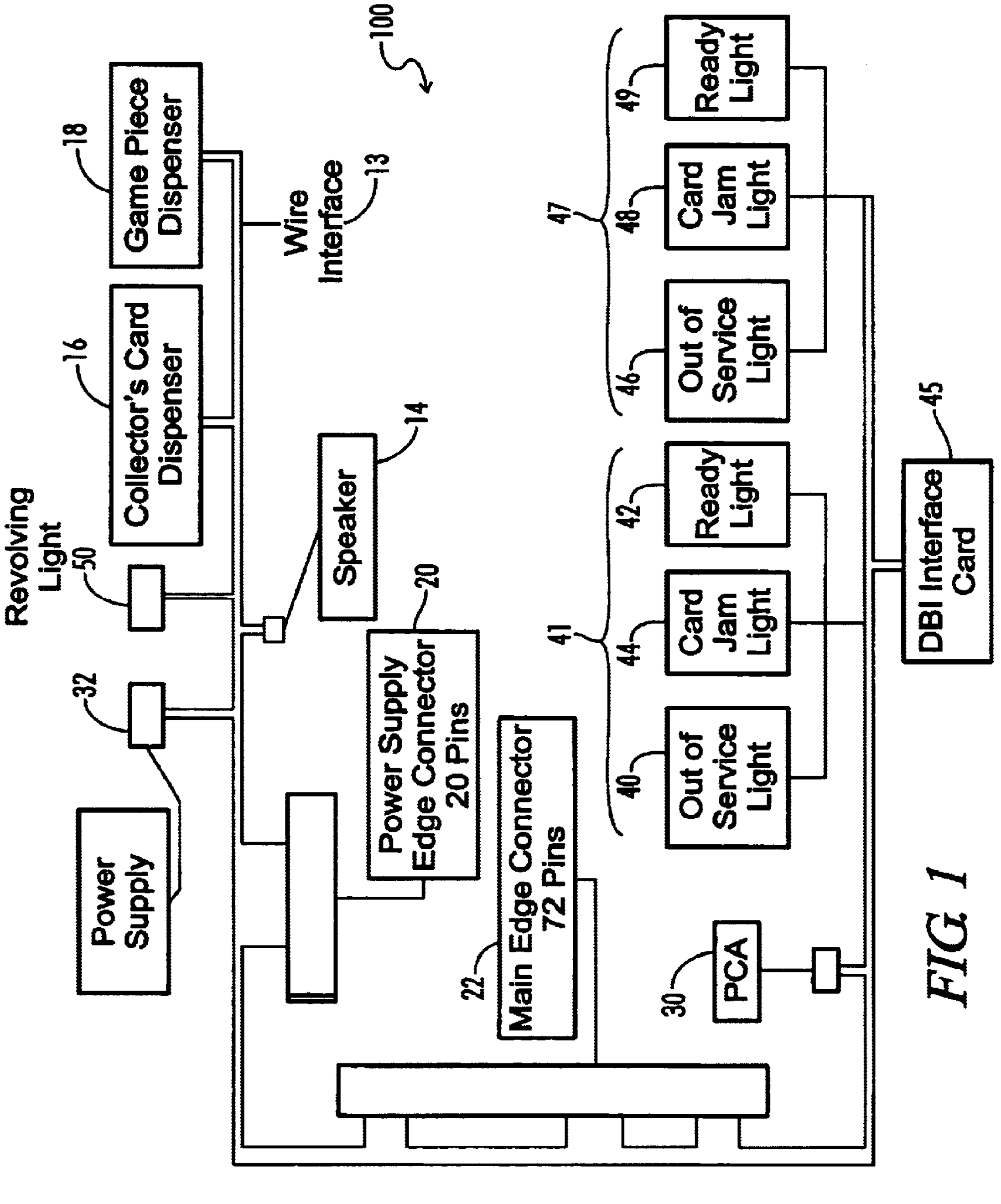
FIG. 1 is a block diagram of the dispensing system of the present invention.
Figure 2:
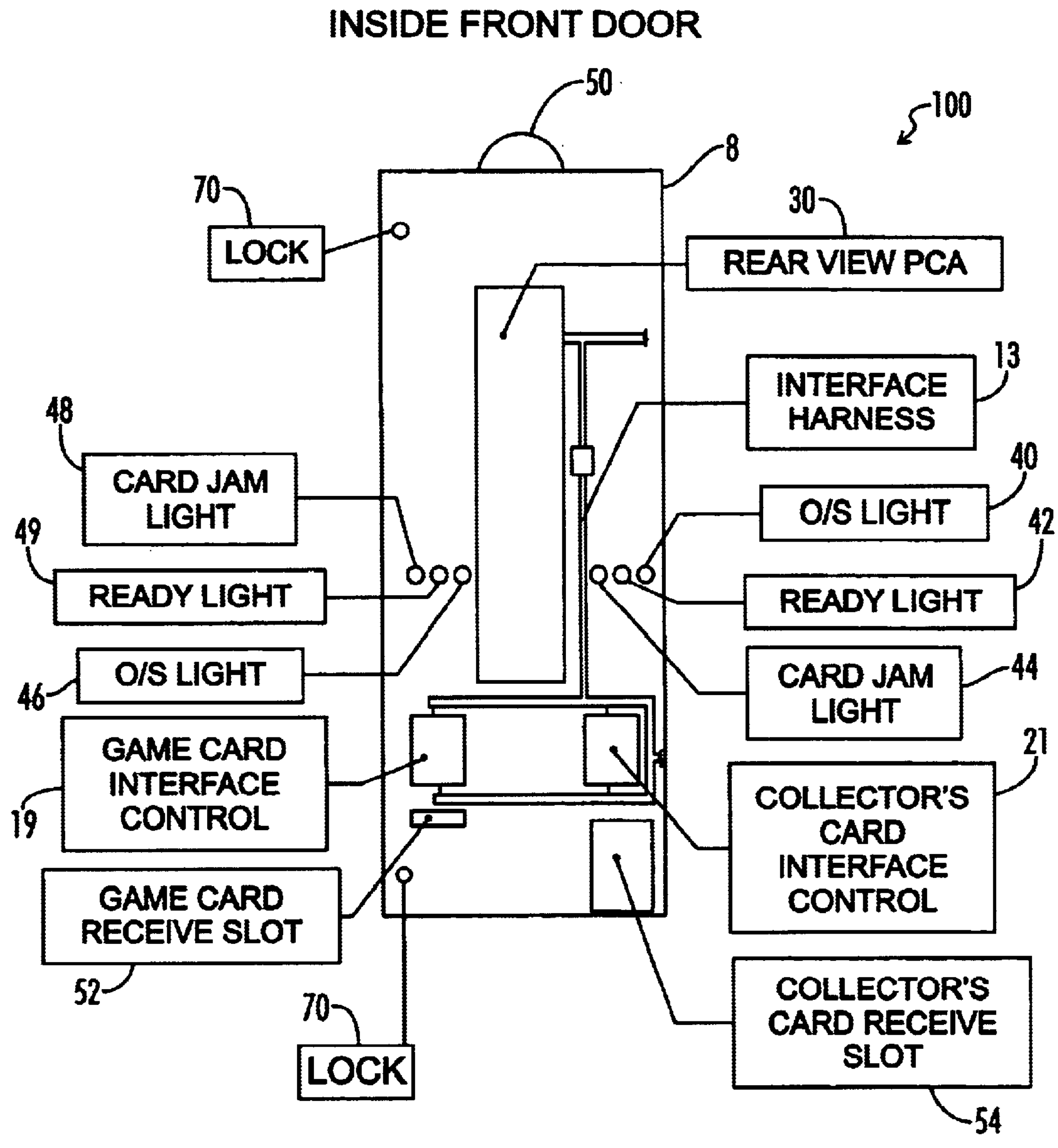
FIG. 2 is a block diagram of the components of the system as viewed from inside of the front system cabinet door.
Figure 3:
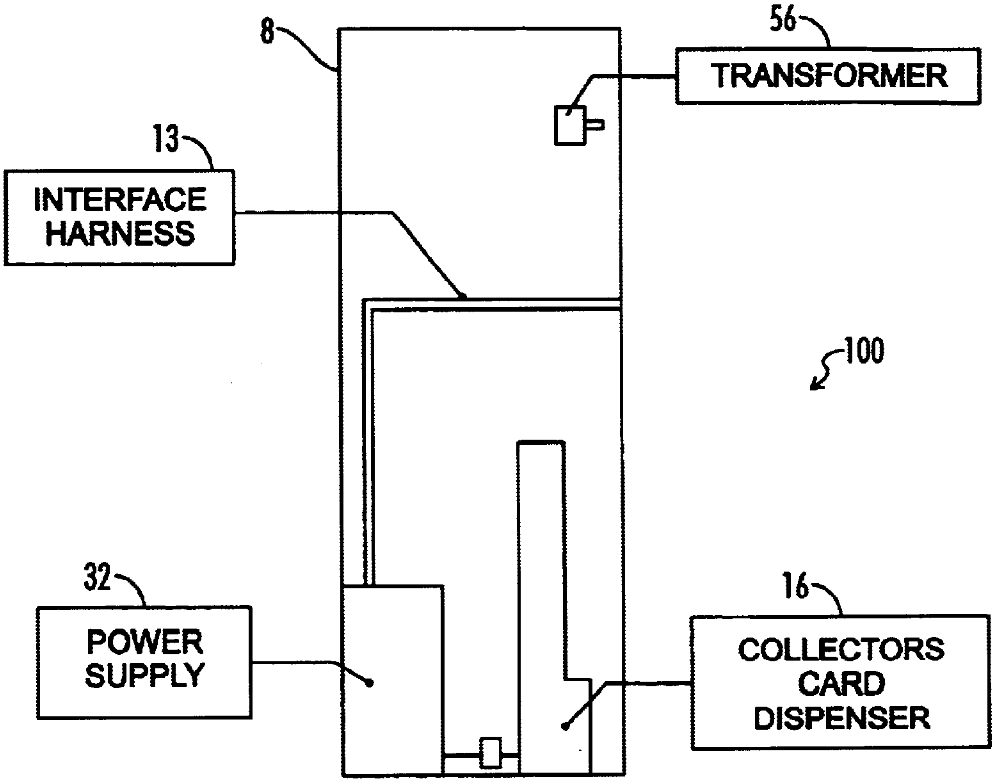
FIG. 3 is a block diagram of the system as viewed from inside the left side of the system cabinet.
Figure 4:
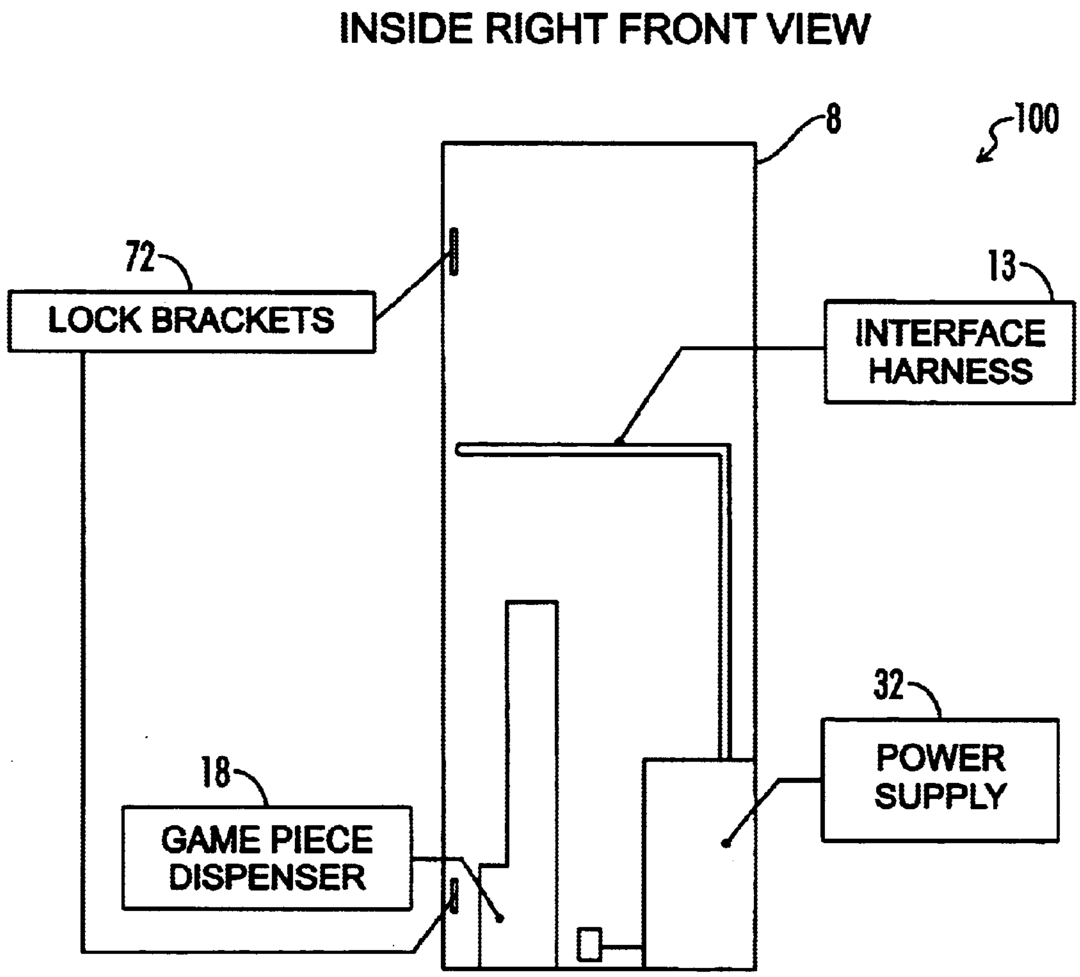
FIG. 4 is a block diagram of the system as viewed from inside the right front of the system cabinet.
Figure 5:
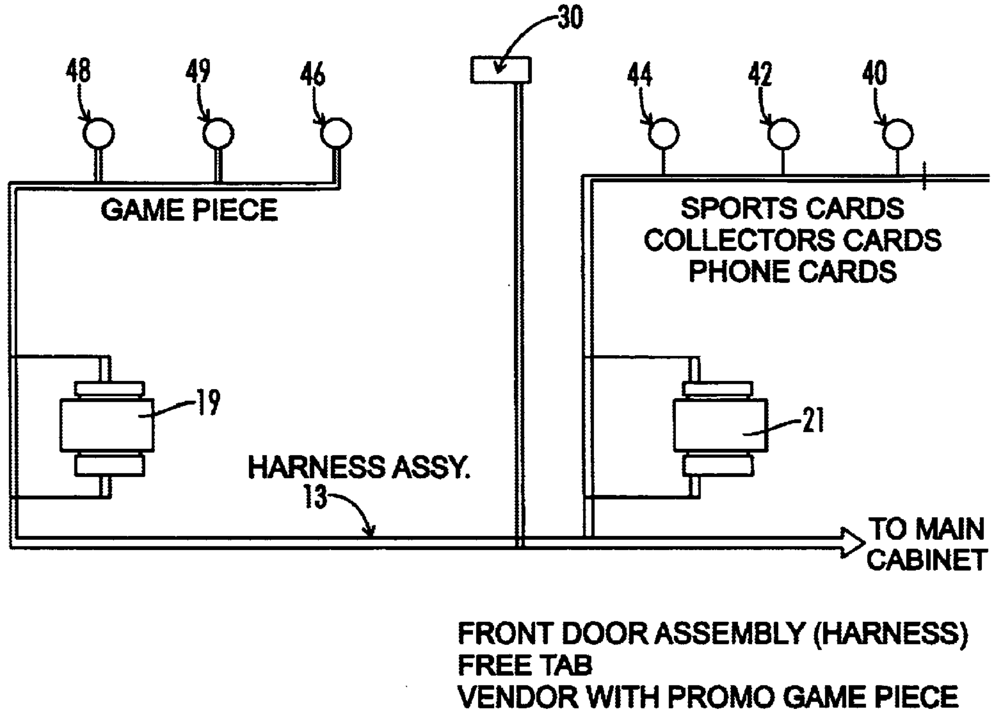
FIG. 5 is a block diagram of the wiring harness associated with the front door of the system cabinet.
Figure 6:
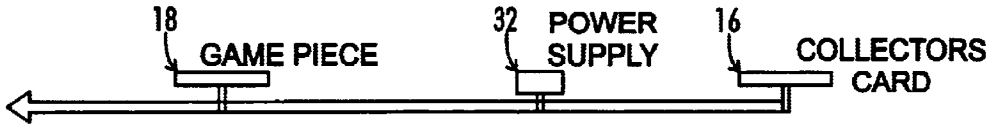
FIG. 6 is a block diagram of an internal wiring harness of the system.

Referring now to the drawings, FIG. 1 shows the connection of the main components of the collector's card dispensing system 100 of the present invention: pair of the microprocessor controlled interface cards 19, 21 (FIGS. 2 and 5) using copyrighted control program associated with the interface cards 19, 21; a collector's card dispenser apparatus 16; and a game piece dispenser apparatus 18 mounted inside a system cabinet 8 (FIGS. 3 and 4). These components are integrated together via a wired interface 13, or an interface harness as shown on FIG. 6. The interface 13 will incorporate a power supply bus and a data bus to provide for communication of electrical signals and commands to the various electronic and electromechanical devices shown on FIG. 1. The power supply 32 is shown at the base of the cabinet 8 in FIGS. 3 and 4. The power supply 32 is connected to all the electronic and electromechanical devices throughout the system 100, including both the collector's card dispenser 16 and the game piece dispenser 18. The power supply 32 receives power from a wall outlet.

The collector's card dispenser 16 is a conventional electromechanical machine of Asahi-Seiko, USA, model CD-1300 or similar style, that is used to distribute the collector's series cards (such as sports cards) or phone cards upon insertion of money into the paper currency acceptor ("PCA") 30. The PCA 30 is conventionally used in food vending machines, and sends an electrical signal to the control interface card 21 (FIG. 2) to register the correct amount of currency credits received in relation to the value of the currency inserted. The interface card 21 then directs the collector's card dispenser 16 to dispense the appropriate number of collector's cards as related to the dip switch settings interpreted by the program on the interface card 21. Simultaneously, the PCA 30 sends a signal to interface card 19 to register the correct amount of currency credits received in relation to the value of the currency inserted. The interface card 19 then directs the game piece dispenser 18 to dispense the appropriate number of instant win game pieces as related to the dip switch setting interpreted by the program on the interface card 19.

The game piece dispenser 18 is a conventional electromechanical machine of Asahi-Seiko, USA, model CD-1100 or similar style, used to distribute various kinds of game pieces whereby a game can be played on a single game piece. Such games include a pull-tab game or a rub-off game. To play the pull-tab game piece, the customer breaks open the pull-tab on the game piece to determine if the customer is a winner. To play the rub-off game piece, the customer must rub off a covering on the game piece to view a hidden pattern of symbols that reveals if the customer has won a promotional prize.

The operation of the system and the play of the game pieces are overseen by a licensee who is able to assist in the distribution of the games. The licensee is also needed to provide free game pieces for persons with vouchers from winning game pieces so that the person can play a promotional game.

In the operation of the collector's card dispensing system 100, the user first enters currency (coin or paper) into the PCA 30. The PCA 30 then sends a signal to the collector's card dispenser 16 (through a collector's card interface control card 21) and the game piece dispenser 18 (through a game piece interface control card 19) to distribute a number of collector's cards and instant win game pieces corresponding to the number of credits associated with the currency provided the system.

Physically, the system is housed in a system cabinet 8 as shown in FIGS. 2–4. The cabinet 8 has a set of locks 70 (see FIG. 2) that intersect with the lock brackets 72 (see FIG. 4).

Additionally, there are two sets of identifying lights that are located on the game cabinet 8 as shown in FIGS. 1 and 2: a collector's card informational light display 41 (comprising indicator lights 40, 42 and 44 shown on FIGS. 1 and 5) used with the collector's card dispenser 16 and a game piece information light display 47 (comprising indicator lights 46, 48, and 49 shown on FIGS. 1 and 5) used with the game piece dispenser 18. Therefore, the system is able to notify the licensee in control of the system when there is a problem with either the collector's card dispenser 16 or the game piece dispenser 18. In either case, the licensee will be able to find and correct the problem in one dispenser without disrupting the other dispenser.

If either the collector's card dispenser 16 or the instant win game piece dispenser 18 should become empty, an interrupt switch (not shown) located inside both the collector's card dispenser 16 and the instant win game piece dispenser 18 would prevent operation of the system 100 until the empty dispenser is refilled. During the period while the system 100 is empty of cards, a "Collector's Card Out of Service" light 40 would be illuminated if the collector's card dispenser 16 was empty or a "Game Piece Out of Service" light 46 would be illuminated if the game piece dispenser 18 was empty. Either Out of Service light 40, 46 would thereby notify the licensee to replenish the empty supply.

Additionally, the system provides for two other indicator lights used with the collector's card information light display 41 of the collector's card dispenser 16 and the game piece informational light display 47 of the game piece dispenser 18. A "Collector's Card Jam" light 44 notifies the licensee if the collector's card dispenser 16 becomes jammed, or a "Game Piece Jam" light 48 notifies the licensee if the game piece dispenser 18 becomes jammed. The "Collector's Card Dispensed" light 42 notifies the user that the collector's card has been delivered into the collector's card receive slot 54 (FIG. 2), and a "Game Piece Dispensed" light 48 notifies the user that the instant win game piece has been delivered into the game piece receive slot 52 (FIG. 2).

During operation of the game, the system can generate effects to make the game more exciting. A speaker system 14 may be connected to the system 100 to allow for sound effects or any other type of beneficial sound. Further, a revolving light 50 may be placed on top of the cabinet containing the system to be activated when a user wins, as shown in FIG. 2.

Thus, although there have been described particular embodiments of the present invention of a new and useful Collector Card/Phone Card Dispensing System with Promotional Instant Win Game Piece Feature, it is not intended that such references be construed as limitations upon the scope of this invention except as set forth in the following claims.

What is claimed is:

1. A system for dispensing collector's cards to a user comprising:

a system cabinet;

a currency acceptor mounted in the system cabinet;

a plurality of collector's cards stored in the system cabinet, each of the collector's cards having an intrinsic value that is not dependent on a game of chance;

a plurality of promotional game pieces stored in the system cabinet, each of the promotional game pieces having a game piece value determined by a promotional game of chance separate from the system;

a collector's card dispensing mechanism operative to dispense the collector's cards, the collector's card dispensing mechanism mounted in the system cabinet;

a game piece dispensing mechanism operative to dispense the promotional game pieces separately from the collector's cards, the game piece dispensing mechanism being mounted in the system cabinet but separate from the collector's card dispensing mechanism;

a collector's card dispenser interface operatively connected to the currency acceptor and to the collector's card dispensing mechanism;

a game piece dispenser interface operatively connected to the currency acceptor and to the game piece dispensing mechanism;

the game piece dispenser interface and the collector's card dispenser interface each being operable to receive a currency received signal from the currency acceptor;

the collector's card dispenser interface being operable to send a collector's card distribution signal to the collector's card dispensing mechanism to dispense the collector's card in response to the currency received signal;

the game piece dispenser interface being operable to send a game piece distribution signal to the game piece dispensing mechanism to dispense the game piece in response to the currency received signal so that when a user of the system enters currency into the currency acceptor that is sufficient to purchase the collector's card, the separate game piece is simultaneously dispensed as a free game piece; and interrupt means to prevent the game piece dispensing mechanism from dispensing the free game piece in response to the currency received signal if no collector's card is available in the system to be dispensed from the collector's card dispensing mechanism.

2. The system of claim 1 further comprising a game piece informational light display connected to the game piece dispensing mechanism to provide operating information to the user.

3. The system of claim 2 wherein the game piece informational light display further comprises a game piece jam light, the game piece jam light operating when a game piece cannot be dispensed through the game piece dispensing mechanism.

4. The system of claim 2 wherein the game piece informational light display further comprises a game piece out of service light, the game piece out of service light operating when the game piece dispensing mechanism is empty of game pieces.

5. The system of claim 2 wherein the game piece informational light display further comprises a game piece ready light, the game piece ready light operating when the game piece dispensing mechanism is operating properly.

6. The system of claim 1 further comprising a collector's card informational light display connected to the collector's card dispensing mechanism to provide operating information to the user.

7. The system of claim 6 wherein the collector's card informational light display further comprises a collector's card jam light, the collector's card jam light operating when a collector's card cannot be dispensed through the collector's card dispensing mechanism.

8. The system of claim 6 wherein the collector's card informational light display further comprises a collector's card out of service light, the collector's card out of service light operating when the collector's card dispensing mechanism is empty of collector's cards.

9. The system of claim 6 wherein the collector's card informational light display further comprises a collector's card ready light, the collector's card ready light operating when the collector's card dispensing mechanism is operating properly.

10. The system of claim 1, wherein the collector's cards include sports cards.

11. The system of claim 1, wherein the collector's cards include phone cards.

12. The system of claim 1 wherein the game piece is a pull tab game piece.

13. The system of claim 1 wherein the game piece is a rub-off game piece.

14. A method of distributing collector's cards from a collector's card dispensing system to a user comprising the steps of:

accepting currency from the user through an electromechanical currency acceptor associated with the system;

analyzing the currency received from the user to determine the amount of credits to register;

providing a signal to a collector's card dispenser interface from the currency acceptor, the signal corresponding to a predetermined amount of currency deposited in the currency acceptor, the predetermined amount corresponding to an intrinsic value of at least one of the collector's cards, the intrinsic value being independent of a game of chance;

providing a signal from the collector's card dispenser interface to the collector's card dispensing mechanism;

dispensing the collector's card from a collector's card dispensing mechanism according to the signal provided by the microprocessor;

providing a signal to a game piece dispenser interface from the currency acceptor, the signal corresponding to the amount of currency deposited in the currency acceptor;

providing a signal from the game piece dispenser interface to a game piece dispensing mechanism that is separate from the collector's card dispensing mechanism;

dispensing the game piece from the game piece dispensing mechanism according to the signal provided by the microprocessor so that the user simultaneously receives the game piece as a separate free bonus game piece when the user purchases the collector's card, the game piece having a value that is dependent on a game of chance separate from the card dispensing system; and interrupting operation of the game piece dispensing mechanism when no collector's cards are available for dispensing from the collector's card dispensing mechanism.

15. The method of claim 14 further comprising the step of promoting the dispensing of the collector's card from the system after the collector's card is dispensed from the collector's card dispensing mechanism using a rotating lamp.

16. The method of claim 14 further comprising the step of promoting the dispensing of the collector's card from the system using a speaker connected to the microprocessor.

17. The method of claim 14, further comprising:

providing a collector's card selected from a card group, the card group comprising sports cards and phone cards.

18. The method of claim 14 further comprising the step of providing a free game piece to the user in response to receiving a voucher from the user.

19. An apparatus for marketing collector's cards to a user comprising:

a wire interface;

a supply of collector's cards stored in the apparatus, each of the collector's cards having an intrinsic value that is not dependent on a game of chance;

a supply of game pieces stored in the apparatus separately from the collector's cards, each of the game pieces having a value that is dependent on a separate game of chance;

a collector's card dispenser to distribute the collector's cards, the card dispenser connected to the wire interface;

a game piece dispenser to distribute the game pieces, the game piece dispenser connected to the wire interface, the game piece dispenser being separate from the collector's card dispenser;

a currency acceptor to receive coins or paper currency, the currency acceptor connected through the wire interface to a microprocessor and operable to provide a signal to the microprocessor corresponding to the amount of currency deposited into the currency acceptor;

the microprocessor operable to provide a signal to the collector's card dispenser and to the game piece dispenser to cause the distribution of the collector's card and the separate game piece in response to entry of sufficient currency to purchase the collector's card; and the microprocessor further operable to interrupt operation of the game piece dispenser if no collector's cards are available in the apparatus for dispensing from the collector's card dispenser.

20. The apparatus of claim 19 further comprising:

a plurality of game piece dispenser status lights connected to the game piece dispenser to inform the user of the status of the game piece dispenser.

21. The apparatus of claim 19 further comprising:

a plurality of collector's card dispenser status lights connected to the collector's card dispenser to inform the user of the status of the collector's card dispenser.

22. The apparatus of claim 19, wherein the collector's cards include sports cards.

23. The apparatus of claim 19, wherein the collector's cards include phone cards.

24. A method of selling collector cards from a collector card vending machine to a purchaser, the method comprising the steps of:

(a) supplying the vending machine with a plurality of collector cards, each of the collector cards having an intrinsic value that is not dependent on a game of chance;

(b) supplying the vending machine with a plurality of promotional game pieces, each of the promotional game pieces having a game piece value determined by a promotional game of chance separate from the vending machine;

(c) offering to dispense to the card purchaser a promotional game piece, conditioned upon a user purchasing, and the vending machine dispensing at least one of the collector cards;

(d) accepting currency into the vending machine;

(e) registering in the vending machine a value of the currency accepted;

(f) dispensing from a first product dispenser in the vending machine at least one of the collector's cards when the value of the currency accepted is at least equal to a predetermined collector card value corresponding to the intrinsic value of at least one of the collector cards; and (g) conditioned on at least one of the collector cards being dispensed from the first product dispenser, dispensing from a second product dispenser in the vending machine at least one of the promotional game pieces.

25. The method of claim 24 further comprising the step of alternatively providing a free game piece to a user in response to receiving a free game voucher from the user.

* * * * *